(12) United States Patent
Kim

(10) Patent No.: US 7,359,408 B2
(45) Date of Patent: Apr. 15, 2008

(54) APPARATUS AND METHOD FOR MEASURING AND COMPENSATING DELAY BETWEEN MAIN BASE STATION AND REMOTE BASE STATION INTERCONNECTED BY AN OPTICAL CABLE

(75) Inventor: Kyou-Seung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 974 days.

(21) Appl. No.: 10/767,206

(22) Filed: Jan. 30, 2004

(65) Prior Publication Data

US 2004/0184487 A1    Sep. 23, 2004

(30) Foreign Application Priority Data

Jan. 30, 2003    (KR) ................................. 2003-6427

(51) Int. Cl.
*H04Q 7/30* (2006.01)
(52) U.S. Cl. ...................... 370/509; 370/514
(58) Field of Classification Search ............... 370/509, 370/514
See application file for complete search history.

(56) References Cited

U.S. PATENT DOCUMENTS 5,805,584 A    9/1998    Kingston et al.
6,920,155 B2 *    7/2005    Rao ........................... 370/503
6,975,607 B2 *    12/2005    Sekine et al. ............... 370/331

FOREIGN PATENT DOCUMENTS

JP    11177484    7/1999
WO    WO 96/13914    5/1996

* cited by examiner

Primary Examiner—Melvin Marcelo
(74) Attorney, Agent, or Firm—Roylance, Abrams, Berdo & Goodman, L.L.P.

(57) ABSTRACT

An apparatus and method for measuring and compensating for delay between a main base station and a remote base station interconnected by an optical cable. The main base station inserts a test pattern into an overhead part of an SDH frame to transmit the SDH frame to the remote base station, receives the SDH frame looped back by the remote base station to detect the test pattern, and measures propagation delay according to the test pattern. At least one frame alignment word (FAW) is detected at a predetermined position in the received SDH frame, and a delay error is calculated according to FAW detection information. The measured propagation delay with the delay error is compensated and produces propagation delay caused by the optical cable. A modulator/demodulator (MODEM) compensates for delay of a baseband signal to be transmitted to the remote base station.

19 Claims, 10 Drawing Sheets

APPARATUS AND METHOD FOR MEASURING AND COMPENSATING DELAY BETWEEN MAIN BASE STATION AND REMOTE BASE STATION INTERCONNECTED BY AN OPTICAL CABLE

PRIORITY

This application claims priority to an application entitled "APPARATUS AND METHOD FOR MEASURING AND COMPENSATING DELAY BETWEEN MAIN BASE STATION AND REMOTE BASE STATION", filed in the Korean Intellectual Property Office on Jan. 30, 2003 and assigned Serial No. 2003-6427, the contents of which are hereby incorporated by reference.

BACKGROUND OF THE INVENTION

1. Field of the Invention

The present invention relates to a synchronous mobile communication system, and more particularly to an apparatus and method for measuring and compensating delay between a main base station and a remote base station interconnected by an optical cable.

2. Description of the Related Art

A cellular mobile communication system divides an entire service area into a plurality of cells and covers the cells using base stations. An overlay cell can be formed between adjacent cells in an actual wireless environment. A user mobile unit can receive signals from at least two base stations associated with the overlay cell. In this case, a handoff procedure must be performed according to a communication control signal exchanged between the base stations so that the cellular mobile communication system can maintain communications for the user mobile unit that moves between the cells. Of course, synchronization must be achieved between the base stations so that a handoff can be supported in a synchronous mobile communication system based upon code division multiple access (CDMA) technology.

In the case of an urban district having a greater population density than a rural district, a cell needs to be divided into a plurality of pico-cells or micro-cells. In this case, the pico-cells or micro-cells are covered by remote base stations having a smaller capacity connected to the main base station. Conventionally, the main base station is designed so that it can include a digital unit for processing a CDMA digital signal and a radio frequency (RF) unit for processing an RF carrier signal. The remote base stations can be connected to the main base station by coaxial cables, wireless connections, optical cables, and so on. Because the mobile communication system supports a high data rate, there is a great deal of interest in using optical cables capable of performing long distance transmissions with low signal loss or degradation.

When the main base station and the remote base stations are separated by the relatively long distance of several to several tens of kilometers, the time period required for transmitting a forward baseband signal from the main base station to the remote base stations is proportional to the distance, and relatively large time delays can be incurred between the main base station and the remote base stations. The relatively large time delays can have different values. The different time delays can cause RF signals from the remote base stations to be asynchronously transmitted. In particular, when a mobile unit communicates with a plurality of remote base stations, the problem of asynchronization between the base and the remote base stations can cause speech quality of the mobile unit to be degraded.

FIG. 1 is a block diagram illustrating the configuration of a mobile communication system employing the typical micro-cell or pico-cell architecture.

In the mobile communication system shown in FIG. 1, three remote base stations (RUs) 21 to 23 are connected to one main base station (MU) 20, and the remote units 21 to 23 convert baseband signals received from the main base station 20 into RF signals to transmit the RF signals to a mobile unit 10. The mobile unit 10 receives three RF signals containing the same data from the remote base stations 21 to 23.

FIG. 2 is a block diagram illustrating components constituting the main base station 20 and one of the remote base stations 21 to 23 shown in FIG. 1. In FIG. 2, one optical communication technique for interconnecting the main base station 20 and the remote base stations 21 to 23 employs synchronous digital hierarchy (SDH).

Referring to FIG. 2, the main base station 20 includes a digital processing unit 20a for processing a digital baseband signal, an SDH processing unit 20b for performing a conversion operation between the digital baseband signal and an SDH frame, and an electric/optical (E/O) interface 20c for performing an interface between the SDH frame and an optical signal. The remote base station 21 includes an E/O interface 21a for performing an interface between the optical signal and the SDH frame, an SDH processing unit 21b for performing a conversion operation between the SDH frame and the digital baseband signal, and a radio frequency (RF) processing unit 21c for performing a conversion operation between the digital baseband signal and an RF signal.

Conventional communication techniques employed by mobile communication systems concentrate on the transmission of data over long distances at a high data rate, without any error, and never consider delay incurred by cables. Synchronous CDMA mobile communication systems are very sensitive to signal phase because CDMA mobile communication systems are based upon the smallest element of data referred to as a chip that goes through digital processes such as user identification, coding, decoding, among others. One chip corresponds to 813.8 nanoseconds (ns) when a chip rate of 1.2288 Mcps is employed. When the remote base stations are not synchronized in the synchronous CDMA system, errors can be incurred in the handoff for the mobile unit moving between areas of the remote base stations, and an operation for detecting a signal from the base station is impossible. As a result, communications cannot be appropriately performed.

Furthermore, as a result of the remote base station and the main base station not being synchronized, various states relating to optical signal transmission cannot be confirmed and a set of processes, such as system state management, error detection, among others, cannot be appropriately performed in the conventional communication system that interconnects the main base station and the remote base stations through optical cables. In addition, when the digital baseband signal is processed, there is a problem in that a propagation delay value caused by the optical cable cannot be simply calculated.

SUMMARY OF THE INVENTION

Therefore, the present invention has been made in view of the above problems, and it is one object of the present invention to provide an apparatus and method for synchronizing remote base stations connected to a main base station by optical cables in a synchronous mobile communication system.

It is another object of the present invention to provide an apparatus and method for calculating and measuring propagation delay between a main base station and a remote base station that are interconnected by an optical cable.

It is another object of the present invention to provide an apparatus and method for measuring propagation delay between a main base station and a remote base station by means of overhead information from the main base station.

It is another object of the present invention to provide an apparatus and method for detecting frame alignment information between a main base station and remote base stations and precisely correcting propagation delay.

It is yet another object of the present invention to provide an apparatus and method for measuring and calculating propagation delays between a main base station and remote base stations and compensating the measured and calculated propagation delays.

In accordance with the first aspect of the present invention, the above and other objects can be accomplished by the provision of an apparatus for measuring and compensating propagation delay between a main base station and a remote base station according to a synchronous digital hierarchy (SDH) standard, the main base station being connected to the remote base station by an optical cable. The apparatus for measuring and compensating for propagation delay between a main base station and a remote base station comprises an SDH processing unit, for inserting a test pattern into an overhead part of an SDH frame, transmitting the SDH frame to the remote base station, and for receiving the SDH frame looped back by the remote base station to detect at least one frame alignment word (FAW) from the SDH frame of the remote base station, and a controller for producing a value of propagation delay between the main base station and the remote base station by adding propagation delay measured according to a count value of round trip delay of the SDH frame containing the test pattern to a delay error calculated from detection information of the FAW. The apparatus for measuring and compensating propagation delay between a main base station and a remote base station further comprises a modulator and demodulator (MODEM) for compensating propagation delay of a baseband signal to be transmitted to the remote base station in response to the propagation delay value produced by the controller.

In accordance with the second aspect of the present invention, the above and other objects can be accomplished by the provision of an apparatus for measuring and compensating propagation delay between a main base station and a remote base station according to a synchronous digital hierarchy (SDH) standard, the main base station being connected to the remote base station by an optical cable. The apparatus for measuring and compensating propagation delay between a main base station and a remote base station comprises a controller for receiving propagation delay information indicating a propagation delay value from the main base station through the optical cable, and a radio frequency (RF) processing unit for converting a baseband signal received from the main base station into an intermediate frequency (IF) signal, compensating propagation delay of the IF signal in a unit of less than a chip time according to the received propagation delay information, converting the compensated IF signal into an RF signal, and radiating the RF signal through an antenna.

In accordance with the third aspect of the present invention, the above and other objects can be accomplished by the provision of a method for measuring and compensating propagation delay between a main base station and a remote base station according to a synchronous digital hierarchy (SDH) standard, the main base station being connected to the remote base station by an optical cable. The method for measuring and compensating propagation delay between a main base station and a remote base station comprises inserting a test pattern into an overhead part of an SDH frame to transmit the SDH frame to the remote base station and receiving the SDH frame looped back by the remote base station, detecting at least one frame alignment word (FAW) from the SDH frame, and producing a value of propagation delay between the main base station and the remote base station by adding propagation delay measured according to a count value of round trip delay of the SDH frame containing the test pattern to a delay error calculated from detection information of the FAW. The method for measuring and compensating propagation delay between a main base station and a remote base station further comprises compensating for the propagation delay of a baseband signal to be transmitted to the remote base station in response to the propagation delay value produced by a controller.

In accordance with the fourth aspect of the present invention, the above and other objects can be accomplished by the provision of a method for compensating propagation delay between a main base station and a remote base station according to a synchronous digital hierarchy (SDH) standard, the main base station being connected to the remote base station by an optical cable. The method for measuring and compensating propagation delay between a main base station and a remote base station comprises receiving propagation delay information indicating a propagation delay value from the main base station through the optical cable, converting a baseband signal received from the main base station into an intermediate frequency (IF) signal, and compensating propagation delay of the IF signal in a time unit less than one chip duration according to the received propagation delay information, and converting the compensated IF signal into an RF signal and radiating the RF signal through an antenna.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
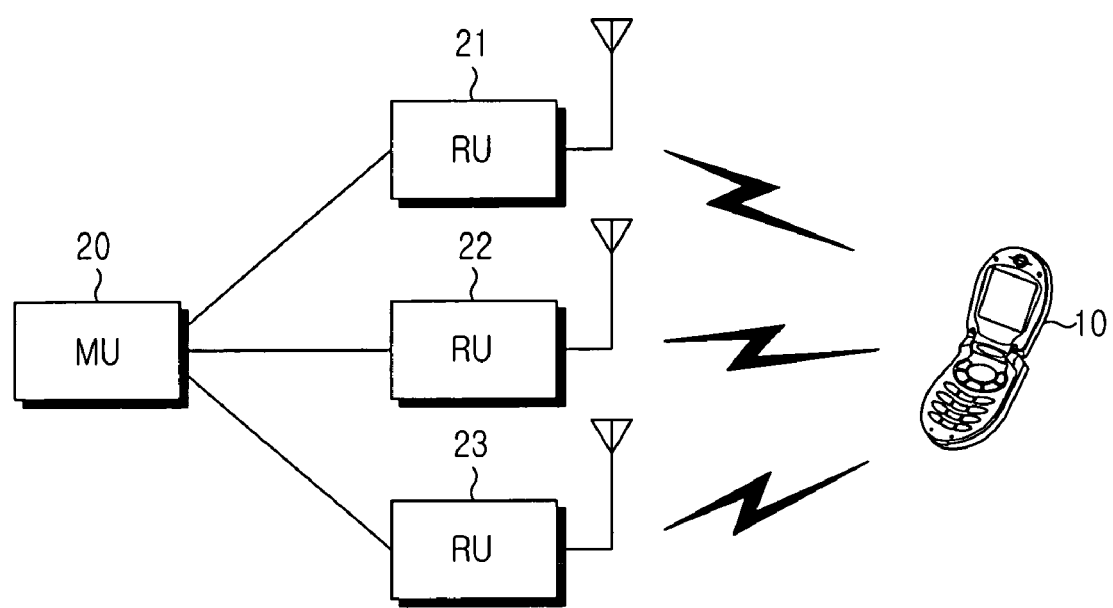
FIG. 1 is a block diagram illustrating the configuration of a mobile communication system employing a conventional micro-cell or pico-cell architecture.
Figure 2:
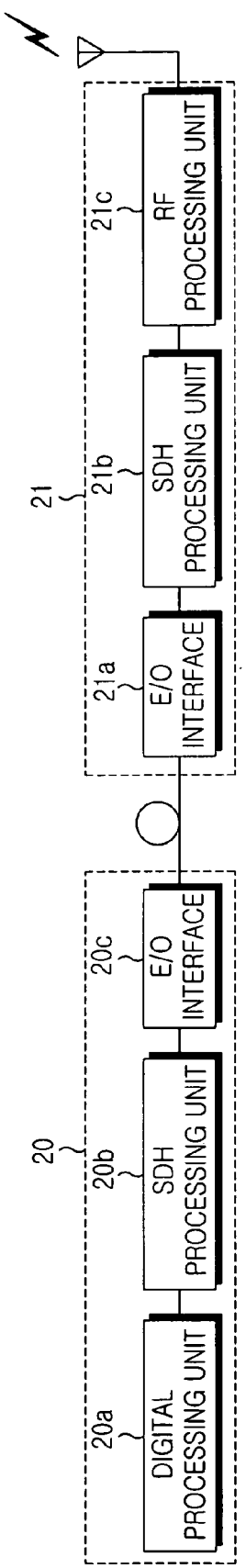
FIG. 2 is a block diagram illustrating components constituting a main base station and a remote base station shown in FIG. 1.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear. The words or expressions to be described below are defined on the basis of functions associated with the embodiments of the present invention. The defined words or expressions can be changed according to intentions or usual practices of a user or a chip designer. Thus, the words or expressions are defined by the entire contents of the present invention.

The embodiments of the present invention described below synchronizes remote base stations connected to a main base station through optical cables using a synchronous digital hierarchy (SDH) standard in a mobile communication system. In accordance with the embodiments of the present invention, correct propagation delay between the main base station and a remote base station is measured and calculated, and the measured and calculated propagation delay is compensated in a digital unit of the main base station and an intermediate frequency (IF) unit of a remote base station.

As is well known, SDH is based upon a method for multiplexing low-speed signals such as E1, T1 and DS3 signals into an optical signal based upon a synchronous transport module N (STM-N) (N=1, 4, 16, 64, 256) according to time division multiplexing (TDM), as standard technology for synchronizing data transmissions through optical cables. Bit rates for each STM are 155.52 Mega-bits per second (Mbps) for N=1, 622.08 Mbps for N=4, 2,488.32 Mbps for N=16, 9,953.28 Mbps for N=64 or 39,813.12 Mbps for N=256. The STM-N is a higher level transport module, and is based upon an N multiple of the bit rate of the STM-1, and multiplexes STM-1 frames in units of bytes.

One of the major features of the SDH is to provide sufficient overhead information necessary for performing communications between network units, payload access and operations, administration, maintenance, and provisioning (OAM&P) of a network, via equipment using optical cables. The OAM&P includes fault surveillance, performance monitoring, provisioning, and security functions.

The embodiments of the present invention enables propagation delays between the main base station and remote base stations interconnected by the optical cables to be measured according to the SDH standard using reserved overhead information of the SDH. However, if the propagation delay is measured using only the overhead information of the SDH, a range of measurable propagation delay is limited by a reference system clock (i.e., 19.44 MHz) that is supplied to an SDH device. Consequently, an additional method is required to correctly calculate a delay error. A frame alignment word (FAW) is employed when the delay error can be calculated. The FAW is detected from an SDH frame received from the main base station, and a propagation delay error is precisely calculated according to its location information.

Figure 3:
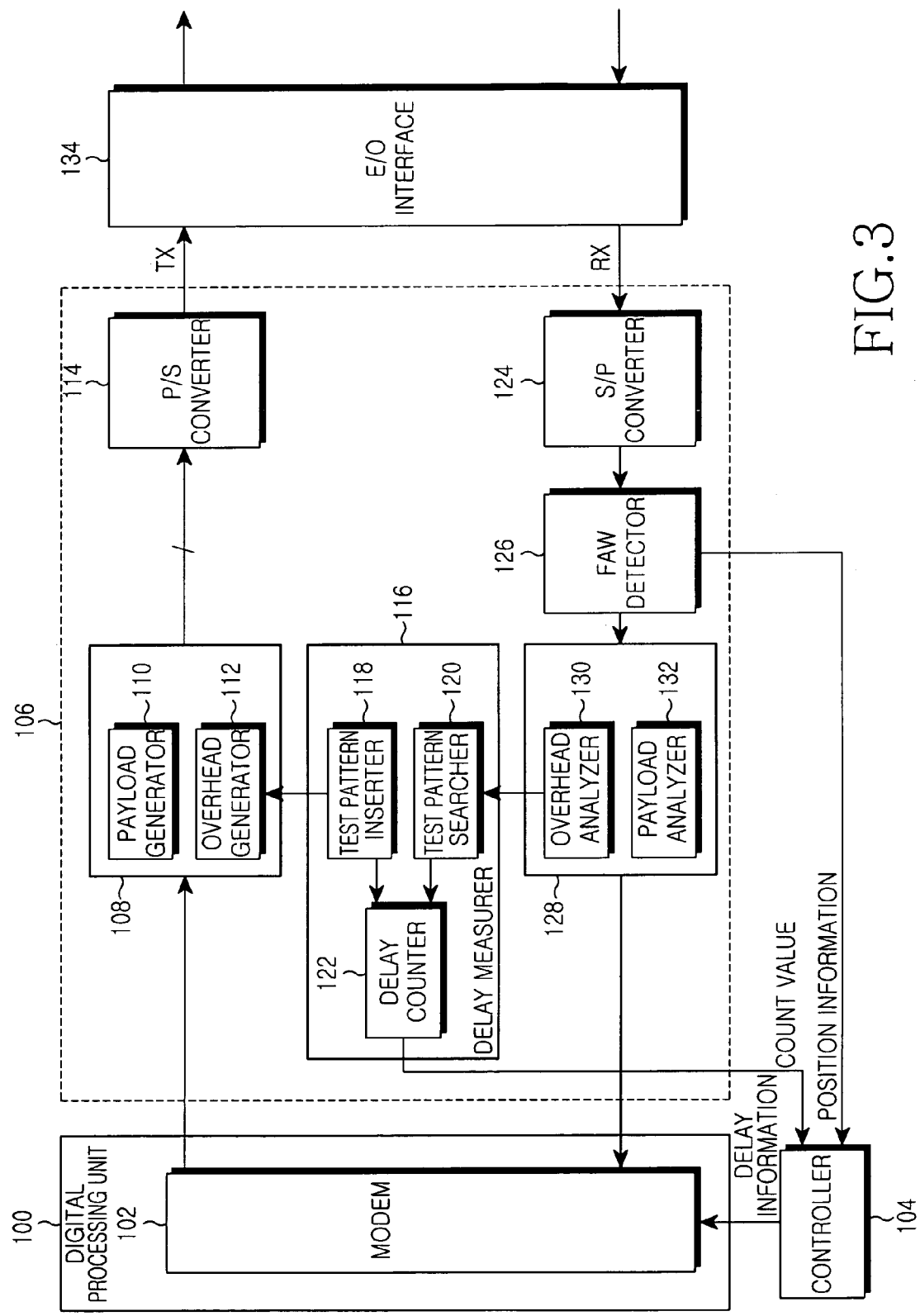
FIG. 3 is a block diagram illustrating the structure of a main base station in accordance with an embodiment of the present invention.

FIG. 3 is a block diagram illustrating the structure of a main base station (MU) in accordance with one embodiment of the present invention.

As shown in FIG. 3, the main base station includes a digital processing unit 100 for processing a digital baseband signal, an SDH processing unit 106 for performing the conversion operation between the digital baseband signal and an SDH frame, an electric/optical (E/O) interface 134 for performing an interface between the SDH frame and an optical signal of the remote base station, and a controller 104 for controlling the digital processing unit 100 so that the delay of propagation to the remote base station (RU) through an optical cable can be compensated.

The digital processing unit 100 includes a modulator and demodulator (MODEM) 102. The MODEM 102 generates data to transmit to the SDH processing unit 106, and processes data received from the SDH processing unit 106.

The SDH processing unit 106 includes a framer 108 for generating an SDH frame, a delay measurer 116 for searching and inserting a test pattern and measuring propagation delay, a de-framer 128 for analyzing overhead and payload information, an FAW detector 126 for detecting an FAW, a parallel/serial (P/S) converter 114, and a serial/parallel (S/P) converter 124.

The framer 108 includes a payload generator 110 and an overhead generator 112. The framer 108 adds SDH overhead information generated by the overhead generator 112 to SDH payload information generated by the payload generator 110 using the transmission data, such that an SDH frame is generated. The SDH frame is converted into a serial format by the P/S converter 114 and then the converted SDH frame is transferred to the remote base station through the E/O interface 134.

When an SDH frame is received from the remote base station through the E/O interface 134, the S/P converter 124 of the SDH processing unit 106 converts the received SDH frame into a parallel format and provides the converted SDH frame to the de-framer 128 through the FAW detector 126. Operation of the FAW detector 126 will now be described in greater detail.

The de-framer 128 includes an overhead analyzer 130 and a payload analyzer 132. The de-framer 128 extracts overhead information from the SDH frame converted into the parallel format and then analyzes the extracted overhead information by means of the overhead analyzer 130. The de-framer 128 refers to the extracted overhead information and then provides payload information extracted by the payload analyzer 132 to the MODEM 102.

Figure 4:
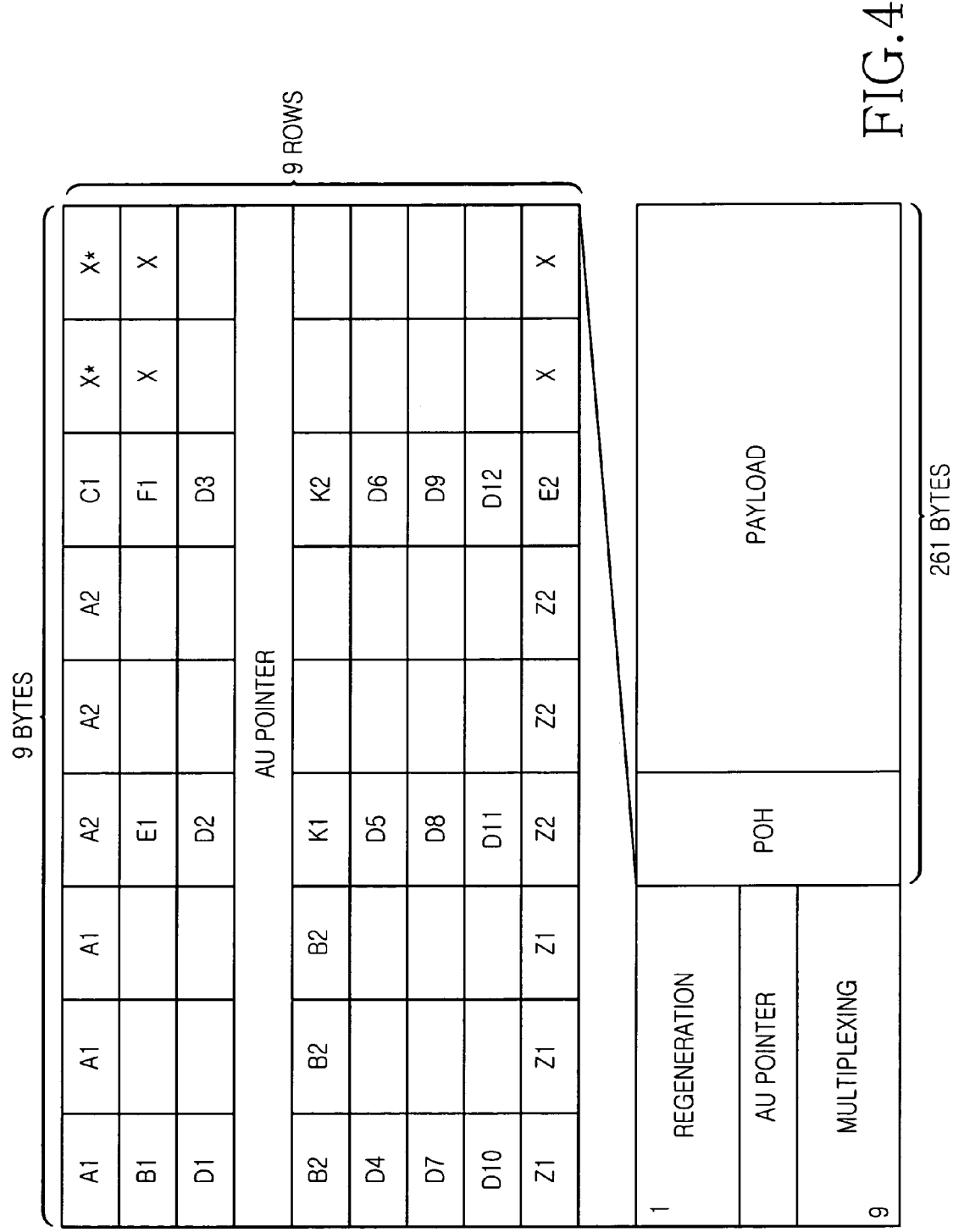
FIG. 4 is an explanatory view illustrating the format of a synchronous transport module 1 (STM-1) frame used for measuring propagation delay between the main base station and a remote base station in accordance with an embodiment of the present invention.

FIG. 4 illustrates the format of the SDH frame exchanged between the main base station and a remote base station in accordance with an embodiment of the present invention. Only an STM-1 frame transmitted through the optical cable at a rate of 155.52 Mbps is shown in FIG. 4. As described above, STM-N frames are a higher level than the STM-1, as they multiplex STM-1 frames in units of bytes.

Referring to FIG. 4, the STM-1 frame is 270 bytes long by 9 rows wide, and an STM-1 frame period is 125 microseconds (μs). As a result, the transmission rate of the STM-1 frame is 155.52 Mbps (=9*(8*270)/125 μs). Nine bytes on the left side of the STM-1 frame indicates a section overhead (SOH) used for frame monitoring, and operations, administration, maintenance, and provisioning (OAM&P), and 261 bytes on the right side of the STM-1 frame indicates a group of administrative units (AUs) containing user information. The SOH is shown in detail at the top portion of FIG. 4. The SOH carries signal regeneration, multiplexing, switching and AU pointer information. The AU group is comprised of a payload section, for carrying a user's voice and data, and a path overhead (POH) section carrying path state information.

In accordance with an embodiment of the present invention, a predetermined test pattern is inserted into a specified byte of the SOH so that propagation delay between the main base station and the remote base station can be measured. For example, the test pattern can be inserted into byte K2 assigned for automatic protection switching (APS) of the SOH.

Returning to FIG. 3, a test pattern inserter 118 included in the delay measurer 116 inserts a predetermined test pattern into an overhead part generated by the overhead generator 112 when the framer 108 generates an SDH frame. When the test pattern is inserted, a delay counter 122 is started. The delay counter 122 is synchronized with a system clock of 19.44 MHz and then outputs a count value of 16 bits.

The framer 108 adds the overhead part containing the test pattern to the payload part generated by the payload generator 110 to generate an SDH frame. The SDH frame is converted into the serial format by the P/S converter 114 and then the converted SDH frame is converted into an optical signal by the E/O interface 134. The E/O interface 134 transmits the optical signal to the remote base station upon receiving the transmitted optical signal containing the converted SDH signal, the SDH processing unit of the remote base station loops back the SDH frame with the inserted test pattern to the SDH processing unit of the main base station.

If the distance between the main base station and the remote base station is equal to or longer than a predetermined distance, the determined propagation delay could be erroneously determined when a test pattern is inserted into each SDH frame. For example, assuming that the distance between the main base station and the remote base station is equal to or longer than 18.75 Km, and the test pattern is inserted every frame period of 125 μs and the inserted frame is then transmitted, distances of 1250 m and 20 Km between the main base station and remote base stations can be calculated as the same distance. For this reason, the test pattern inserter 118 inserts a test pattern every predetermined period (e.g., every fifth frame). A frame containing the test pattern is referred to as a super frame.

Test pattern searcher 120 included in the delay measurer 116 transmits an SDH frame (i.e., a super frame) with the test pattern inserted as described above. Whenever the super frame is received from the remote base station, the test pattern searcher 120 checks the position (e.g., "K2" shown in FIG. 4) of the overhead part specified in the received frame and then determines whether the test pattern inserted into the checked overhead part is equal to that inserted by the test pattern inserter 118.

If the test pattern inserted into the checked overhead part is equal to that inserted by the test pattern inserter 118 as, the test pattern searcher 120 stops the delay counter 122. The count value from the delay counter 122 is transferred to the controller 104. The delay counter 122 operates in response to a system clock of 19.44 MHz.

The controller 104 receiving the count value from the delay counter 122 calculates the round trip delay (RTD) between the transmission operation of the SDH frame with the inserted test pattern and the reception operation of the SDH frame looped-back by the remote base station. Furthermore, the controller 104 subtracts a predetermined SDH processing time from the calculated RTD and then divides the result of the subtraction by 2, such that propagation delay between the main base station and the remote base station can be measured.

Figure 5:
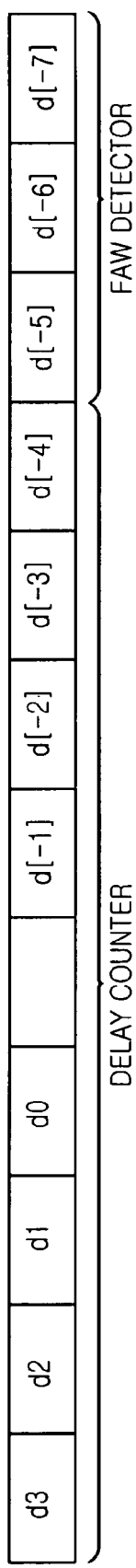
FIG. 5 is an explanatory view illustrating a delay range measurable in a delay counter shown in FIG. 3 and a range of a delay error capable of being corrected in a frame alignment word (FAW) detector shown in FIG. 3, based upon a time unit of a chip duration.

FIG. 5 is an explanatory view illustrating a delay range measurable in the delay counter 122 shown in FIG. 3, based upon a time unit of a chip duration. One chip duration corresponds to 813.8 nanoseconds (ns) when a standard chip rate of 1.2288 Mcps is employed. As shown in FIG. 5, the propagation delay can be calculated to 4 decimal places d3 to d[−4] by means of the count value of the delay counter 122. It can be found that a delay error having a value of more than the 4 decimal places cannot be calculated. The FAW detector 126 corrects the delay error.

The FAW detection operation of the FAW detector 126 is carried out in units of bits. Where a rate of 155.52 Mbps is employed, the delay value capable of being detected using an FAW is $\frac{1}{2}*(\frac{1}{155.52}$ Mbps$)=3.215$ ns. The minimum delay value recognizable in the FAW detector 126 is 6.43 ns ($=\frac{1}{155.52}$ Mbps$=$a $\frac{1}{128}$ chip). However, when a round trip distance is considered, the measurable delay value becomes 3.215 ns, which is half of 6.43 ns The measurement of propagation delay by the delay counter 122 is carried out in a time unit of approximately $\frac{1}{32}$ of a chip. Because deviation due to power on or off is more than the $\frac{1}{32}$ of a chip, the time unit for measuring the propagation delay incorporating a substantial margin of accuracy is a level, or quanitzation of approximately $\frac{1}{4}$ to $\frac{1}{8}$ chip. Alternatively, the range of error capable of being detected using the FAW is based upon a time unit of a $\frac{1}{256}$ chip (3.215 ns). Although deviations due to external factors are considered, a quanitzation level of approximately $\frac{1}{32}$ to $\frac{1}{64}$ chip can be ensured. A precise clock compensation of the quanitzation level of a $\frac{1}{64}$ chip can be achieved.

Figure 6:
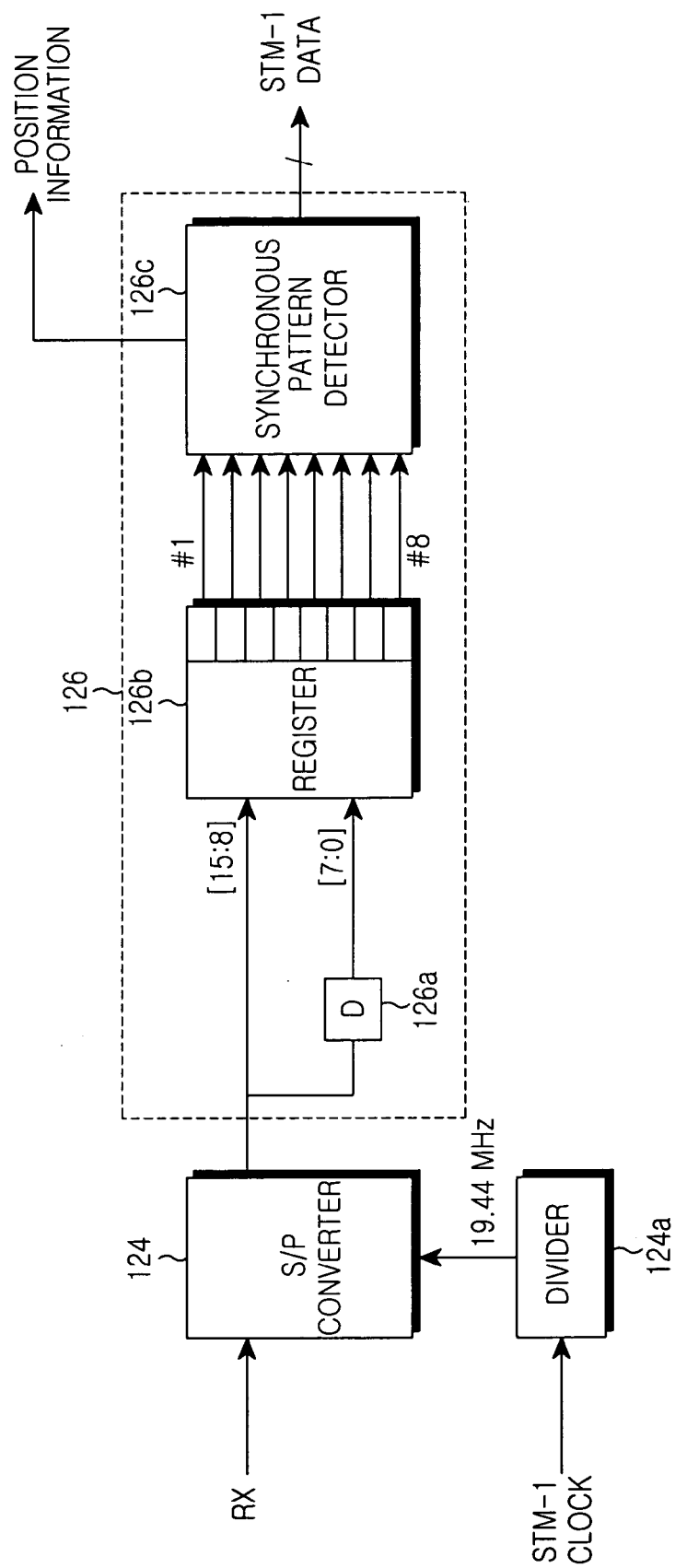
FIG. 6 is a block diagram illustrating components constituting the FAW detector shown in FIG. 3.

FIG. 6 is a block diagram illustrating components of the FAW detector 126 shown in FIG. 3.

Referring to FIG. 6, clock divider 124a receives the STM-1 clock of 155.52 MHz and divides the received clock by 8, such that a system clock of 19.44 MHz is generated. The clock divider 124a provides the generated system clock of 19.44 MHz to components of the SDH processing unit 106. The S/P converter 124 converts serial data (e.g., an STM-1 frame) received from the remote base station through the optical cable at a rate of 155.52 MHz into parallel data of 8 lines in response to the system clock of 19.44 MHz. The S/P converter 124 transfers the parallel data to the FAW detector 126.

A delay device 126a delays the parallel data by one bit. Eight modules constituting a data register 126b store 8 bits, respectively. Accordingly, the data register 126b stores eight 8-bit data units (actually being 15-bit data) that have a phase difference of 6 ns.

In the case of the STM-1 frame, FAWs indicating a start of the frame are set to the hexadecimal value of F6 (which is equivalent to the binary representation of 11110110) and the hexadecimal value of 28 (equivalent to 00101000). The FAWs are repeatedly inserted into three A1 positions and three A2 positions of the STM-1 frame shown in FIG. 4, respectively. The FAW of "F6" is inserted into the three A1 positions, and the FAW of "28" is inserted into the three A2 positions. Thereafter, a synchronous pattern detector 126*c* compares the 8-bit data units stored in the 8 modules with the FAWs of "F6" and "28", and selects a module having matching data.

Figure 7:
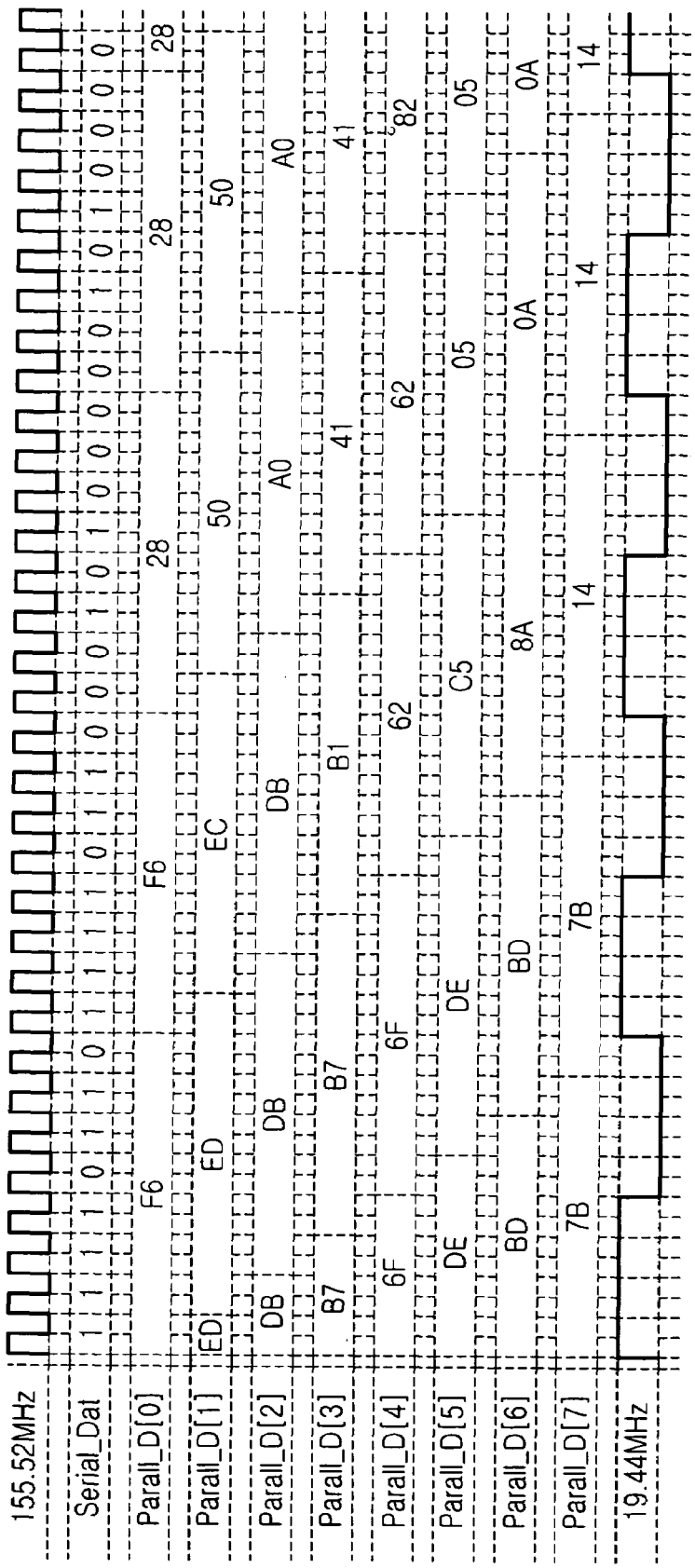
FIG. 7 is a timing diagram illustrating an operation for detecting the FAW by means of data stored in modules.

FIG. 7 is a timing diagram illustrating an operation for detecting the FAW by means of data stored in the modules. For the sake of simplification, it is defined that the FAWs of "F6" and "28" are repeated twice, respectively.

Referring to FIG. 7, serial data Serial_Dat received at a rate of 155.52 MHz is synchronized with a clock of 19.44 MHz and is converted into parallel data Parall_D[0]. The parallel data Parall_D[0] and 7 parallel data units Parall_D [1], Parall_D[2] . . . Parall_D[7] generated after 1-bit shifting operations are stored in the modules of the data register 126*b*.

The synchronous pattern detector 126*c* compares data stored in the data register 126*b* with "F6" and "28" every clock period, and determines that the FAWs are detected in a specific module when two "F6" FAWs and two "28" FAWs are contained in the data stored in the specific module. Position information of the module from which the FAWs are detected is provided to the controller 104 so that propagation delay can be calculated. Data stored in the module from which the FAWs are detected is transferred to the de-framer 128 so that received data can be detected.

The position information of the module from which the FAWs are detected can be 8-bit information containing a bit value "1" indicating a corresponding module of the 8 modules or 3-bit information indicating an index of a corresponding module. The controller 104 calculates a delay error between the main base station and the remote base station according to the position of the module from which the FAWs are detected.

In the case of FIG. 7, "F6" consecutively repeated twice and "28" consecutively repeated twice are present in the first module Parall_D[0], and hence position information to be provided to the controller 104 is "10000000" or "000". If so, the controller 104 determines a delay error between the main base station and the remote base station to be 0 ns. If the FAWs have been detected from the third module Parall_D [2], a delay error between the main base station and the remote base station is ½*(1/155.52 MHz)=3.2 ns.

The controller 104 calculates the correct delay between the main base station and the remote base station by adding the calculated delay error to a delay value measured by a test pattern of the SDH frame. The controller 104 compensates the propagation delay while controlling the MODEM 102.

As an explanatory example, the SDH processing unit 106 inserts a predetermined test pattern into an overhead part of the SDH frame (i.e., STM-1 frame) of 155.52 Mbps and then transfers the frame to the remote base station. At this point, the SDH processing unit 106 starts the delay counter 122 with a system clock (19.44 MHz). The delay counter 122 is synchronized with the system clock and increments a count value by "1" every 51.4 ns (=1/19.44 MHz).

When a test pattern contained in an overhead part of an SDH frame received from the remote base station is equal to that of a transmitted SDH frame, the delay counter 122 is stopped and then outputs a count value. At this point, RTD is 5140.0 ns (=100*51.4 ns) when the count value is "100". If the RTD value is divided by 2, a delay time measured by the test pattern becomes 2572.0 ns.

If the serial data (or STM-1 frame) of 155.52 Mbps at a reception path is converted into a parallel format with a system clock of 19.44 MHz, 8-bit data is consecutively generated every 51.4 ns. A position corresponding to a phase of a predetermined FAW is detected from the 8-bit data, and the delay error caused by a transmission cable between the main base station and the remote base station is calculated using a time unit of 6.4 ns (=1/155.52 MHz). When the FAW detection position is a position in which the FAW is detected, the delay error caused by the transmission cable becomes 6.4 ns (=2*½*6.4 ns where "2" is a type of offset value based upon the FAW detection). In this case, the delay time caused by the transmission cable between the main base station and the remote base station is 2578.4 ns (=2572.0 ns+6.4 ns).

The controller 104 compensates the delay of data to be transmitted to the remote base station according to the measured and calculated propagation delay. Here, the delay based upon a time unit of a chip duration (813.8 ns) is compensated by the MODEM 102 of the main base station, while delay based upon a time unit less than one chip duration is compensated by the remote base station.

Regarding the compensation of the main base station, the value of the propagation delay measured and calculated by the SDH processing unit is used when the main base station controls the MODEM 102. As the MODEM 102 modulates user data and then outputs a baseband signal, the propagation delay based upon the time unit of a chip duration can be compensated when the clock necessary for outputting the baseband signal is adjusted. The delay compensation by the MODEM 102 can be achieved when the signal destined for each of the remote base stations is transmitted earlier by an amount of time equal to the delay time.

The propagation delay of 2578.4 ns calculated in the above-described example corresponds to 3.1683 chips (=2578.3 ns/813.8 ns) when being converted into the number of chip durations. The 3.1683 chips are equal to a sum of 3 chips and a 0.1683 chip (=4 chips−a 0.8317 chip). The MODEM included in the main base station transmits a baseband signal early by 4 chip durations.

Figure 8:
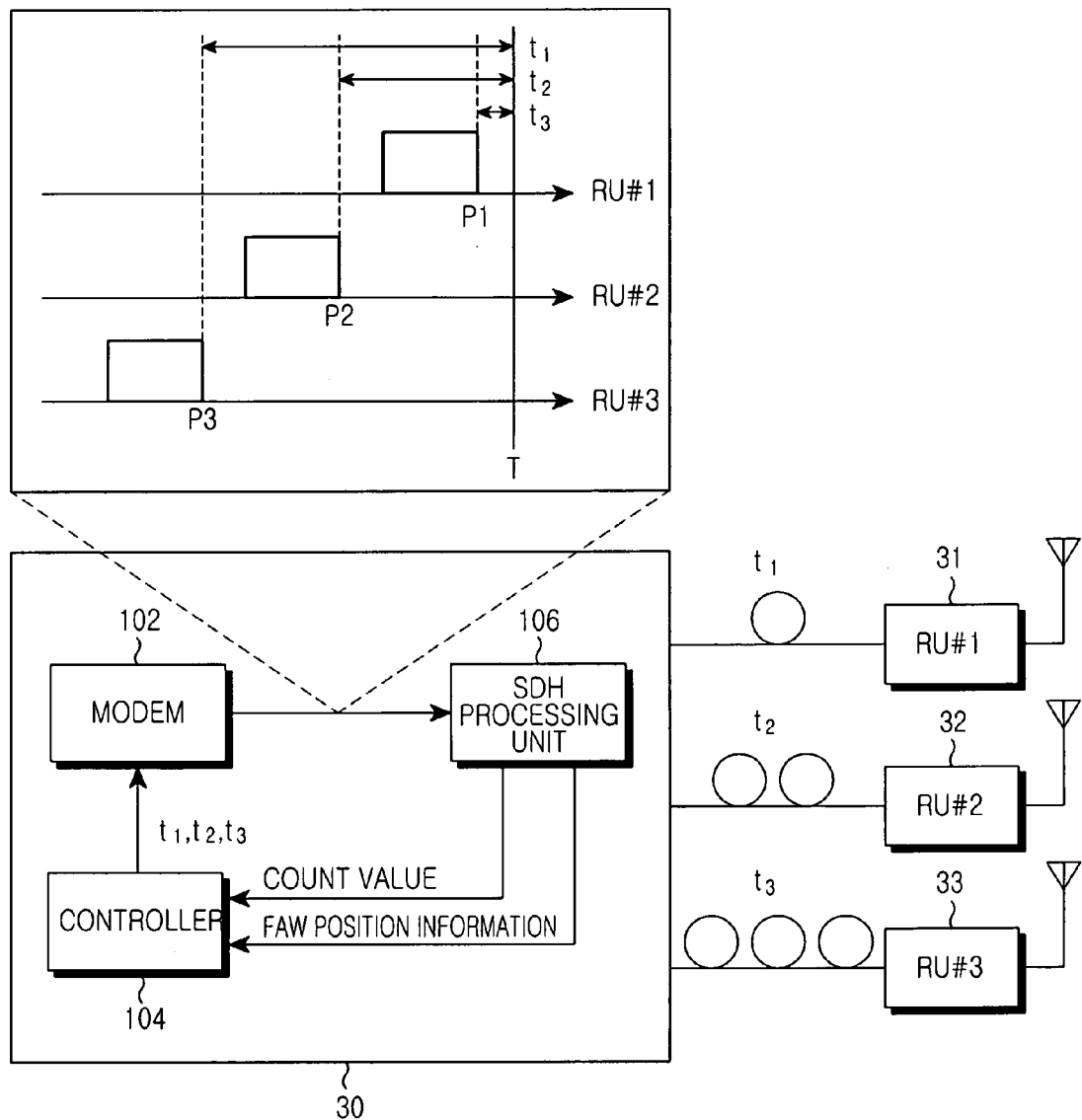
FIG. 8 is an explanatory view illustrating an example of an operation for measuring and calculating propagation delay by means of a looped-back synchronous digital hierarchy (SDH) frame in accordance with an embodiment of the present invention.

FIG. 8 is an explanatory view illustrating an example of an operation for compensating optical cable delays between a main base station and three remote base stations that are located at different distances from the main base station.

Referring to FIG. 8, a main base station (MU) 30 is connected to first to third remote base stations (RUs) 31, 32 and 33 through optical cables. The distance between the first remote base station 31 and the main base station 30 is the shortest, and the distance between the third remote base station 33 and the main base station 30 is the longest. The SDH processing unit 106 of the main base station 30 provides a round trip count value of a test pattern inserted into the overhead part of an SDH frame and FAW detection information to the controller 104. The controller 104 finds delay values t1, t2 and t3 associated with the first to third remote base stations 31, 32 and 33 by employing round trip count values and the FAW detection information. The delay values have the relationship of t1<t2<t3.

Under the control of the controller 104, the MODEM 102 first outputs a baseband signal having the longest delay time t3 destined for the third remote base station 33 (at a time P3). Then, the MODEM 102 outputs a baseband signal having the shortest delay time t1 destined for the first remote base station 31 lastly (at a time P1). The baseband signals are then delayed by t1, t2 and t3, respectively, while going through the optical cables, and reach the remote base stations 31, 32 and 33 at substantially the same time T.

The signals reach their destination at substantially the same time because the MODEM 102 cannot achieve a delay compensation in a time unit less than one chip duration. The controller 104 provides information regarding the calculated and measured propagation delay to the remote base station through an SDH frame in the form of control information, however, so that delay compensation based upon a time unit of less than one chip duration can be achieved.

The remote base stations precisely compensate the sync of signals received from the main base station using the propagation delay information. Signals output from the remote base stations are precisely compensated, and the phase sync between signals propagated from the remote base stations is maintained.

Figure 9:
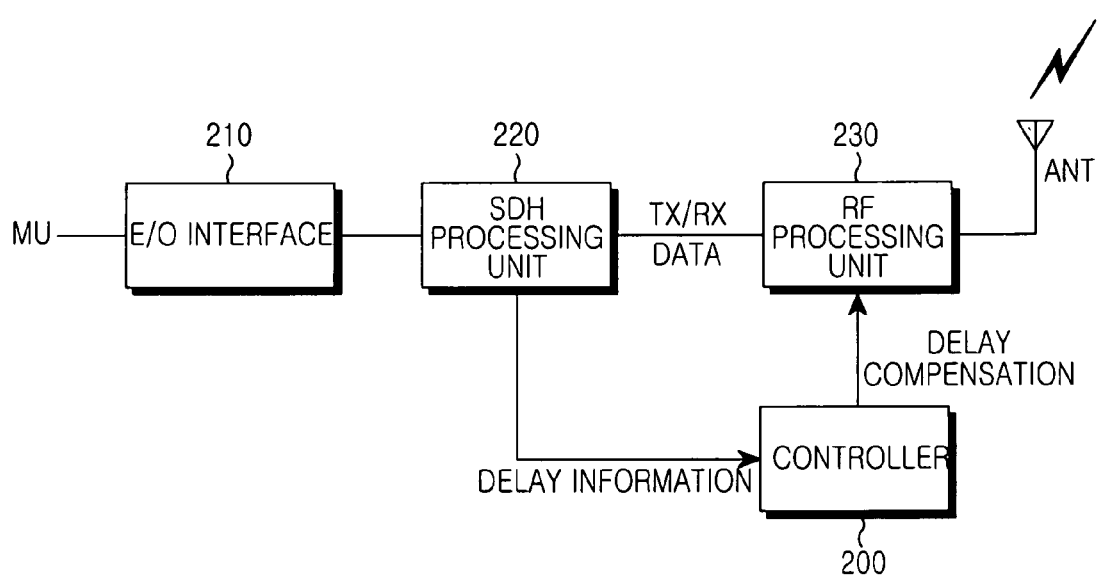
FIG. 9 is a block diagram illustrating a structure of the remote base station in accordance with an embodiment of the present invention.

FIG. 9 is a block diagram illustrating a structure of the remote base station in accordance with one embodiment of the present invention.

As shown in FIG. 9, the remote base station includes an electric/optical (E/O) interface 210 for performing an interface between an optical signal and a synchronous digital hierarchy (SDH) frame, an SDH processing unit 220 for performing the conversion operation between the SDH frame and a digital baseband signal, a radio frequency (RF) processing unit 230 responsible for a conversion operation between the digital baseband signal and an RF signal, and a controller 200 for controlling the RF processing unit 230 so that propagation delay caused by an optical cable coupled to the remote base station can be compensated.

Regarding the transmission operation of the remote base station, the E/O interface 210 converts an optical signal received from the main base station through the optical cable into an SDH frame and then transfers the SDH frame to the SDH processing unit 220. The SDH processing unit 220 then analyzes overhead and payload information contained in the received SDH frame, and transfers the transmission data to the RF processing unit 230. The RF processing unit 230 converts the transmission data into an intermediate frequency (IF) signal, converts the IF signal into an RF signal, and radiates the RF signal through an antenna ANT.

When the SDH frame received from the main base station contains propagation delay information between the main base station and the remote base station, the SDH processing unit 220 provides the propagation delay information to the controller 200. The controller 200 controls the transmission operation of the RF processing unit 230 using the propagation delay information. When converting the received data into an IF signal, the RF processing unit 230 delays the signal by a corresponding delay time, and transmits the delayed signal through the antenna.

Figure 10:
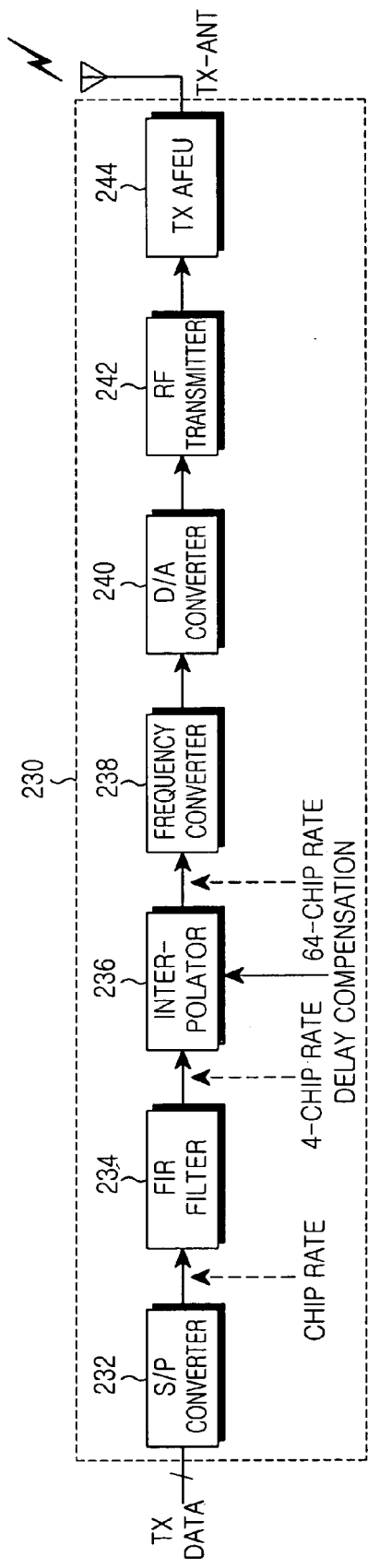
FIG. 10 is a block diagram illustrating components constituting a radio frequency (RF) processing unit shown in FIG. 9.

FIG. 10 is a block diagram illustrating components constituting a radio frequency (RF) processing unit shown in FIG. 9.

Referring to FIG. 10, a serial/parallel (S/P) converter 232 is synchronized with a system clock of 29.4912 MHz from the SDH processing unit 220 and converts transmission data of a serialized frame into parallel data based upon a chip rate. A finite impulse response (FIR) filter 234 performs a 48-tap shaping filtering operation with the parallel data, performs an over-sampling operation at a 4-chip rate, and stabilizes the signal characteristic through a 64-tap phase equalization operation. The FIR filter 234 is designed so that a manager, located at the main base station, can change its filtering coefficients.

Since the rate of the filter data is a 4-chip rate, an interpolator 236 increases the sampling rate so that an IF rate can be achieved. To increase the sampling rate, the interpolator 236 performs 2× interpolation by means of a 48-tap half band filter (HBF) to increase the data rate to an 8-chip rate (CHIP*8), and performs 8× interpolation by means of a 64-tap cascade integrator comb (CIC) filter to increase the data rate to a 64-chip rate (CHIP*64).

Frequency converter 238 includes a multiplier operating at a 64-chip rate (78.6432 MHz), and multiplies the output of the interpolator 236 by cosine and sine waves according to in-phase and quadrature phase channels, such that the output of the interpolator 236 is up-converted into an IF band of 20 MHz. Up-converted data is converted into an analog format according to 14-bit resolution by a digital/analog (D/A) converter 240 based upon the sampling rate 78.6432 MHz (64-chip rate). An RF transmitter 242 converts the analog IF signal into an RF band signal. A transmit antenna front end unit (Tx AFEU) 244 amplifies the RF signal, performs a band pass filtering operation for the amplified RF signal and radiates the result of the band pass filtering operation through a transmit antenna Tx_ANT.

The FIR filter 234 or the interpolator 236 delays the output signal in a time unit of a $\frac{1}{64}$ (or $\frac{1}{48}$) chip duration using the delay compensation information from the controller 200, such that the propagation delay between the main base station and the remote base station can be compensated.

Regarding the delay compensation operation by the interpolator 236, the interpolator 236 delays a CIC filtered signal by the predetermined number of taps and then outputs the delayed signal, such that propagation delay can be compensated. Here, the CIC filter has 64 taps and one tap indicates a delay time corresponding to a $\frac{1}{64}$ chip.

For example, assuming that a delay time measured and calculated by the main base station is 2578.4 ns (=3.1683 chips=4 chips–a 0.8317 chip), the remote base station receives, from the main base station through the optical cable, a baseband signal transmitted early by 4 chip durations. When delay information provided from the main base station is correct, the remote base station determines that the baseband signal is received early by a 0.8317 chip. The 64-tap CIC filter delays the baseband signal by a 53-tap time (=a $\frac{53}{64}$ chip=0.828125*813.8 ns=673.92 ns). Then, the delayed baseband signal is converted into an IF band signal. A result of the compensation in the remote base station corresponds to 3 chips (2441.406 ns)+an 11-tap time (=a $\frac{11}{64}$ chip=0.171875*813.8 ns=139.872 ns)=2581.278 ns, and has a very small error of approximately 2.88 ns in comparison with the delay time of 2578.4 ns calculated by the main base station.

In accordance with the embodiments of the present invention, a mobile communication system can precisely calculate propagation delay between a main base station and a remote base station with a minimum error of a $\frac{1}{256}$ chip, and overcomes problems such as degradation of speech quality, handoff failure, and so on caused by a sync mismatch. Furthermore, the mobile communication system can install remote base stations on the basis of the distribution and characteristics of mobile communication subscribers, thereby efficiently managing a network.

Although the preferred embodiments of the present invention have been disclosed for illustrative purposes, those skilled in the art will appreciate that various modifications, additions and substitutions are possible, without departing from the scope of the invention. Accordingly, the present invention is not limited to the above-described embodiments, but the present invention is defined by the claims which follow, along with their full scope of equivalents.

What is claimed is:

1. An apparatus for measuring and compensating propagation delay between a main base station and a remote base station according to a synchronous digital hierarchy (SDH) standard, the main base station being connected to the remote base station by an optical cable, the apparatus comprising:

an SDH processing unit for inserting a test pattern into an overhead part of an SDH frame to transmit the SDH frame to the remote base station and for receiving the SDH frame looped back by the remote base station to detect at least one frame alignment word (FAW) from the SDH frame of the remote base station;

a controller for producing a value of propagation delay between the main base station and the remote base station by adding propagation delay measured according to a count value of round trip delay of the SDH frame containing the test pattern to a delay error calculated from detection information of the FAW; and a modulator and demodulator (MODEM) for compensating propagation delay of a baseband signal to be transmitted to the remote base station in response to the propagation delay value produced by the controller.

2. The apparatus as set forth in claim 1, wherein the SDH processing unit comprises:

a test pattern inserter for inserting the test pattern into the SDH frame to be transmitted to the remote base station every predetermined frame period;

a test pattern searcher for searching the test pattern from the SDH frame received from the remote base station every predetermined frame period;

a delay counter being started when the test pattern is inserted and being stopped when the test pattern is searched, the delay counter outputting, to the controller, the count value corresponding to the round trip delay of the SDH frame containing the test pattern; and an FAW detector for detecting the FAW from the received SDH frame and outputting position information of the detected FAW to the controller.

3. The apparatus as set forth in claim 2, wherein the FAW detector comprises:

a data register for shifting data received from the remote base station by one bit and storing the shifted data in a plurality of internal modules having a predetermined size; and a synchronous pattern detector for comparing the data stored in the modules with a predetermined FAW pattern and outputting, to the controller, position information of a corresponding module having matched data if the data matches the predetermined FAW pattern.

4. The apparatus as set forth in claim 1, wherein the MODEM compensates the propagation delay of the baseband signal in a time unit of a chip duration.

5. The apparatus as set forth in claim 4, wherein the MODEM transmits the baseband signal early by a predetermined chip time more than the produced propagation delay value.

6. The apparatus as set forth in claim 1, wherein the controller provides information of the produced propagation delay value to the remote base station so that the remote base station can compensate the produced propagation delay value in a time unit less than one chip duration.

7. An apparatus for measuring and compensating propagation delay between a main base station and a remote base station according to a synchronous digital hierarchy (SDH) standard, the main base station being connected to the remote base station by an optical cable, the apparatus comprising:

a controller for receiving propagation delay information indicating a propagation delay value from the main base station through the optical cable; and a radio frequency (RF) processing unit for converting a baseband signal received from the main base station into an intermediate frequency (IF) signal, compensating for propagation delay of the intermediate (IF) signal in a time unit less than one chip duration according to the received propagation delay information, converting the compensated IF signal into an RF signal, and radiating the RF signal through an antenna.

8. The apparatus as set forth in claim 7, wherein the RF processing unit compensates for delay based upon the time unit less than one chip duration except delay based upon a time unit of a chip duration compensated by the main base station according to the propagation delay value.

9. The apparatus as set forth in claim 7, wherein the RF processing unit comprises:

a finite impulse response (FIR) filter for performing oversampling and phase equalization of the baseband signal;

an interpolator for interpolating an output of the FIR filter according to a predetermined interpolation ratio and delaying a result of the interpolation by a predetermined time according to the propagation delay information to perform an output operation;

a frequency converter for converting an output of the interpolator into data of an IF band;

a digital/analog (D/A) converter for converting the data of the IF band into an analog signal;

an RF transmitter for converting the analog signal into a signal of an RF band; and a transmit antenna front end unit for radiating the RF signal through an antenna.

10. The apparatus as set forth in claim 9, wherein the interpolator subtracts, from one chip duration, a delay value based upon the time unit less than one chip duration except delay based upon a time unit of a chip duration compensated by the main base station according to the propagation delay value, and delays the output of the FIR filter by a result of the subtraction.

11. A method for measuring and compensating propagation delay between a main base station and a remote base station according to a synchronous digital hierarchy (SDH) standard, the main base station being connected to the remote base station by an optical cable, the method comprising:

inserting a test pattern into an overhead part of an SDH frame to transmit the SDH frame to the remote base station and receiving the SDH frame looped back by the remote base station;

detecting at least one frame alignment word (FAW) from the SDH frame;

producing a value of propagation delay between the main base station and the remote base station by adding propagation delay measured according to a count value of round trip delay of the SDH frame containing the test pattern to a delay error calculated from detection information of the FAW; and compensating for propagation delay of a baseband signal to be transmitted to the remote base station in response to the propagation delay value produced by a controller.

12. The method as set forth in claim 11, wherein the step of inserting the test pattern comprises:

inserting the test pattern into the overhead part of the SDH frame to be transmitted to the remote base station every predetermined frame period.

13. The method as set forth in claim 11, wherein the step of detecting the FAW comprises:

searching the test pattern from the SDH frame received from the remote base station every predetermined frame period;

starting a delay counter when the test pattern is inserted, stopping the delay counter when the test pattern is searched, and outputting, to the controller, the count value corresponding to the round trip delay of the SDH frame containing the test pattern; and detecting the FAW from the received SDH frame and outputting position information of the detected FAW.

14. The method as set forth in claim 13, wherein the step of outputting the position information of the detected FAW comprises:

shifting data received from the remote base station by one bit;

storing the shifted data in a plurality of internal modules having a predetermined size;

comparing the data stored in the modules with a predetermined FAW pattern and outputting, to the controller, position information of a corresponding module having matched data if the data matches the predetermined FAW pattern.

15. The method as set forth in claim 11, wherein the step of compensating the propagation delay of the baseband signal comprises:

compensating for the propagation delay of the baseband signal using a time unit of a chip duration.

16. The method as set forth in claim 15, wherein the step of compensating the propagation delay of the baseband signal comprises:

transmitting the baseband signal early by predetermined chip durations more than the produced propagation delay value.

17. A method for compensating propagation delay between a main base station and a remote base station according to a synchronous digital hierarchy (SDH) standard, the main base station being connected to the remote base station by an optical cable, the method comprising:

receiving propagation delay information indicating a propagation delay value from the main base station through the optical cable;

converting a baseband signal received from the main base station into an intermediate frequency (IF) signal, and compensating for propagation delay of the IF signal using a time unit less than one chip duration according to the received propagation delay information; and converting the compensated IF signal into an RF signal and radiating the RF signal through an antenna.

18. The method as set forth in claim 17, wherein the step of compensating for the propagation delay in the time unit less than one chip duration comprises:

compensating delay based upon the time unit less than one chip duration except delay based upon a time unit of a chip duration compensated by the main base station according to the propagation delay value.

19. The method as set forth in claim 17, wherein the step of compensating for the propagation delay in the time unit less than one chip duration comprises:

subtracting, from one chip duration, a delay value based upon the time unit less than one chip duration except delay based upon a time unit of a chip duration compensated by the main base station according to the propagation delay value; and delaying an output of a finite impulse response (FIR) filter by a result of the subtraction.

* * * * *